United States Patent
Barry (10) Patent No.: US 8,832,771 B2
(45) Date of Patent: *Sep. 9, 2014

(54) APPARATUS AND METHOD FOR DETECTING A MEDIA DEVICE

(71) Applicant: AT&T Intellectual Property I, LP, Atlanta, GA (US)

(72) Inventor: Jon Barry, Odessa, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,201

(22) Filed: Jun. 4, 2013

(65) Prior Publication Data

US 2013/0268992 A1 Oct. 10, 2013

Related U.S. Application Data

(63) Continuation of application No. 12/559,912, filed on Sep. 15, 2009, now Pat. No. 8,479,250.

(51) Int. Cl.
*H04N 7/173* (2011.01)
*H04R 29/00* (2006.01)
*G01H 17/00* (2006.01)
*G01D 7/00* (2006.01)

(52) U.S. Cl.
USPC .......... 725/133; 381/56; 73/570; 73/587

(58) Field of Classification Search
None
See application file for complete search history.

(56) References Cited

U.S. PATENT DOCUMENTS

| 7,376,414 B2 * | 5/2008 | Engstrom .................. 455/414.3 |
| 2005/0094610 A1 * | 5/2005 | de Clerq et al. ............... 370/338 |
| 2005/0097618 A1 * | 5/2005 | Arling et al. .................. 725/114 |
| 2007/0061830 A1 * | 3/2007 | Chang ................................. 725/9 |
| 2007/0266395 A1 * | 11/2007 | Lee et al. ......................... 725/11 |

\* cited by examiner

*Primary Examiner* — Jason K Lin
(74) *Attorney, Agent, or Firm* — Guntin & Gust, PLC; Jay H. Anderson (57) ABSTRACT

A system that incorporates teachings of the present disclosure may include, for example, a mobile device having a controller to detect a location of a user by detecting at least one of a network associated with the user and a location of the mobile device, wherein the location of the user includes a media processor, transmit a request for an audio command intended for the media processor to a server on a communications network after detecting the location of the user, wherein the audio command is transmitted by the server to the media processor, detect an audio signal emitted from the media processor, wherein the audio signal is caused by the audio command, and determine an identity of the media processor by associating the detected audio signal with the media processor. Other embodiments are disclosed.

20 Claims, 10 Drawing Sheets

APPARATUS AND METHOD FOR DETECTING A MEDIA DEVICE

CROSS-REFERENCE TO RELATED APPLICATIONS

This application is a continuation of U.S. patent application Ser. No. 12/559,912 filed Sep. 15, 2009 which is incorporated herein by reference in its entirety.

FIELD OF THE DISCLOSURE

The present disclosure relates generally to device detection and more specifically to an apparatus and method for detecting a media device.

BACKGROUND OF THE DISCLOSURE

The Internet, local area networks, cable networks, and other networks provide users with a means for experiencing media content, such as radio and television programming The media content can often include audio content, video content, text content, still image content, and/or combinations thereof. Media content providing sources can include Internet Protocol Television (IPTV), cable TV, and satellite TV. Control over media devices that present the media content can be implemented using a number of different remote controllers.

However, when searching for content, users typically have to resort to channel surfing via a typical remote control or by directly changing the channel on the television. Such methods of searching are often times slow and tedious. Other users are able to search for media content or information about the media content through on-screen channel guides. Although more efficient than channel surfing, searching through channel guides can still be slow and difficult to navigate.

DETAILED DESCRIPTION OF THE DRAWINGS

One embodiment of the present disclosure can entail a mobile device having a controller to detect a location of a user by detecting at least one of a network associated with the user and a location of the mobile device, wherein the location of the user includes a media processor, transmit a request for an audio command intended for the media processor to a server on a communications network after detecting the location of the user, wherein the audio command is transmitted by the server to the media processor, detect an audio signal emitted from the media processor, wherein the audio signal is caused by the audio command, and determine an identity of the media processor by associating the detected audio signal with the media processor.

Another embodiment of the present disclosure can entail a method including receiving at a media processor an audio command from a server on a communications network, wherein the audio command is requested by a mobile device communicatively linked to the server, emitting an audio signal after receiving the audio command, wherein the audio signal is detected by the mobile device, and wherein an identity of the media processor is determined by the mobile device based on an association of the audio signal with the media processor.

Yet another embodiment of the present disclosure can entail a computer-readable storage medium having computer instructions to receive a first audio sample from a mobile device, wherein the first audio sample is recorded by the mobile device and represents a portion of a media program playing on a media processor, determine at least one channel that is transmitted to the media processor, determine a channel of the at least one channel which played the media program and an identity of the media processor by analyzing the first audio sample, and transmit the identity of the media processor to the mobile device.

Figure 1:
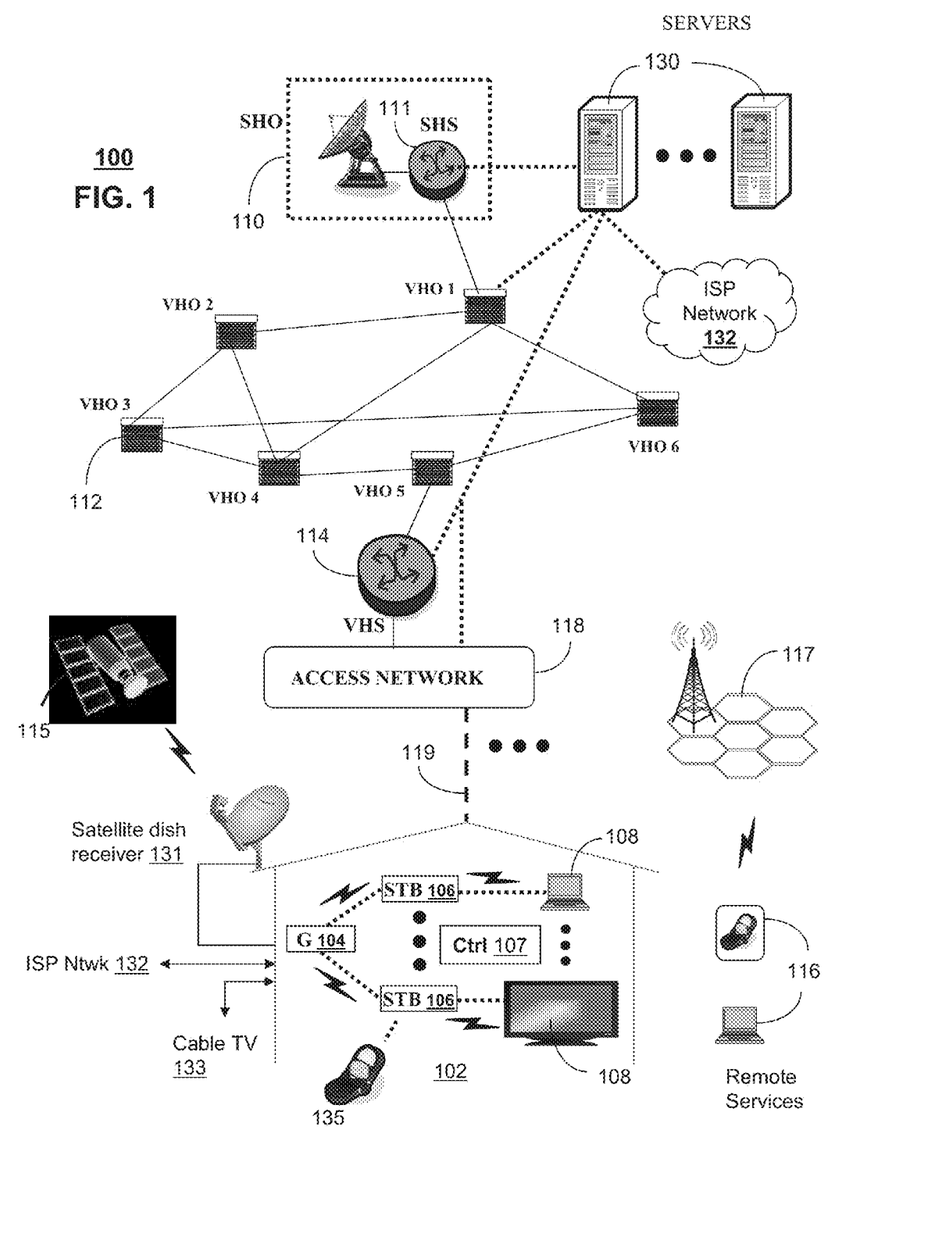
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a mobile device 135. The mobile device 135 can be a cellular phone, personal digital assistant, smart phone, personal computer, or other similar device. The mobile device 135 can configured to detect a network in proximity of the devices in residential building 102 or other networks. Additionally, the mobile device 135 can be operably coupled to the STBs 106 and other devices in the system 100. Notably, mobile device 135 can contain a software application, which can enable the mobile device 135 to detect which STB 106 is currently playing by detecting an audio sample emitted from the STB 106 or media device 108. The mobile device 135 can be further configured to control or receive information from the STBs 106. For example, the mobile device 135 can change the channel that the STB 106 is currently broadcasting or receive information about media programming Another distinct portion of the computing devices 130 can function as a server (herein referred to as server 130). The server 130 can use common computing and communication technology to perform the function of distributing media content and/or other types of content to various devices in the system 100. Notably, the server 130 can be configured to communicatively link to the mobile device 135, gateway 104, and the STBs 106. Additionally, the server 130 can be configured to access, receive and/or analyze content from a local area network containing the security camera 135 and the video conferencing equipment 137 via gateway 104. Other devices can access the content from the server 130 if they are authorized to do so.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
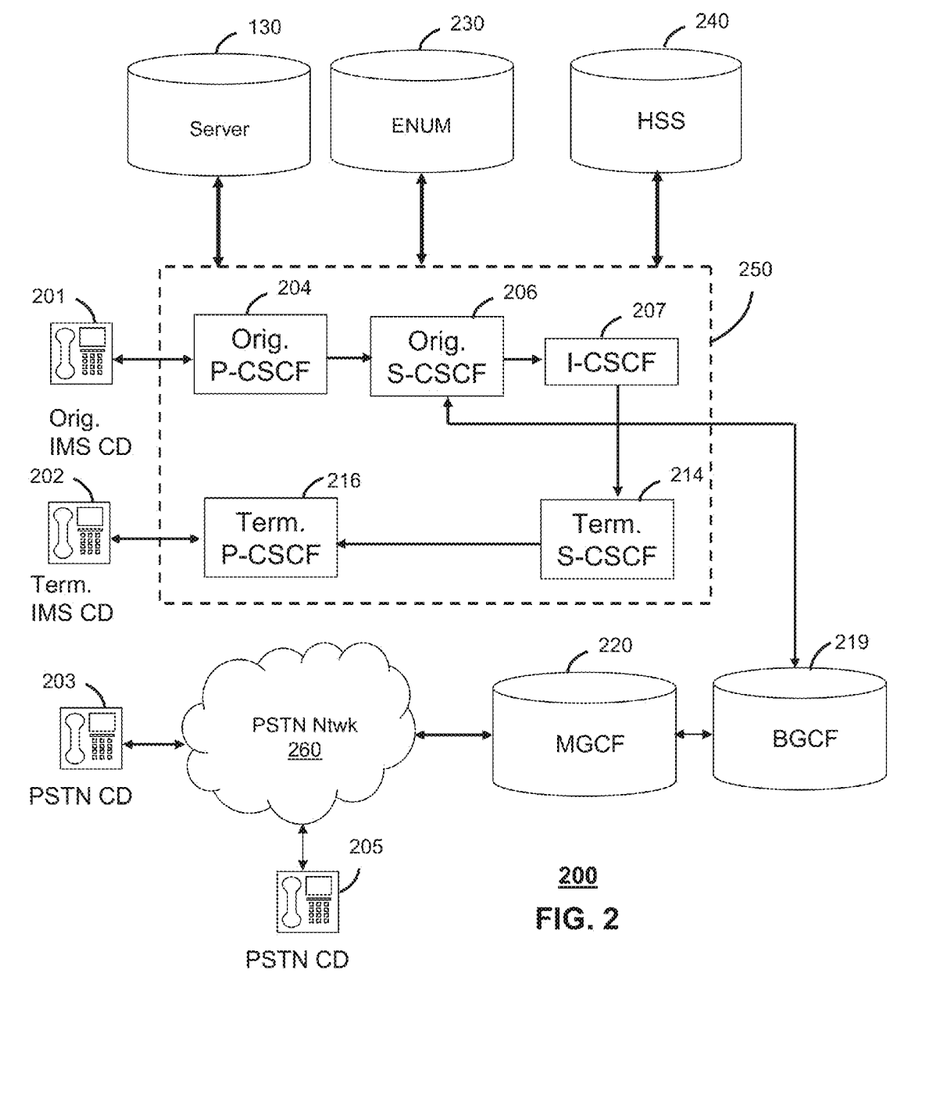

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
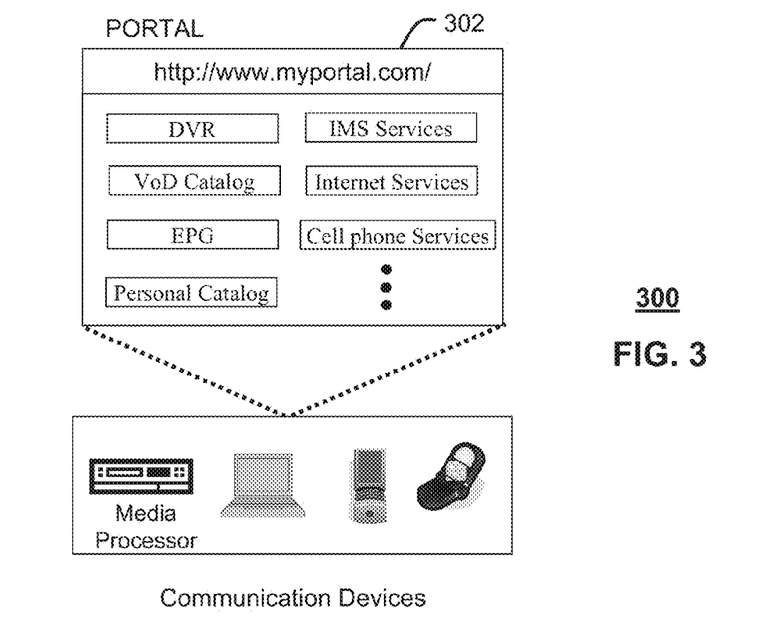
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
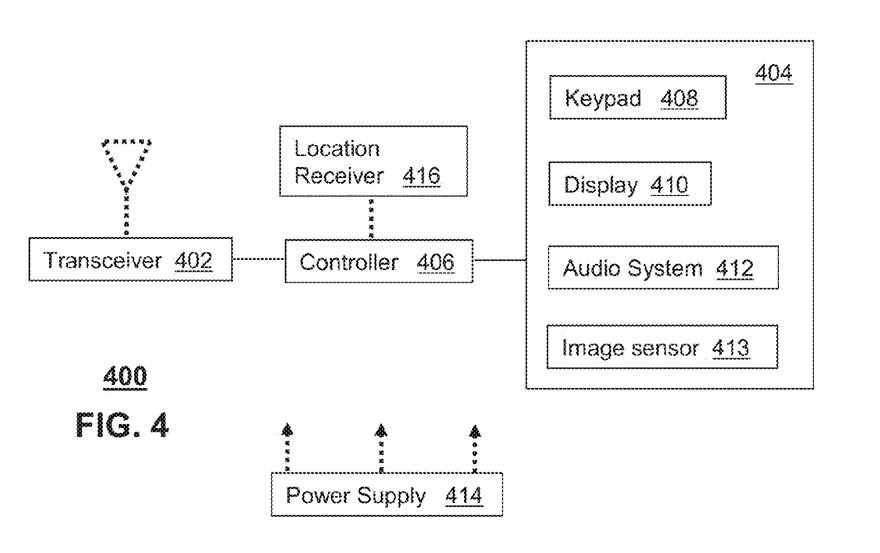
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
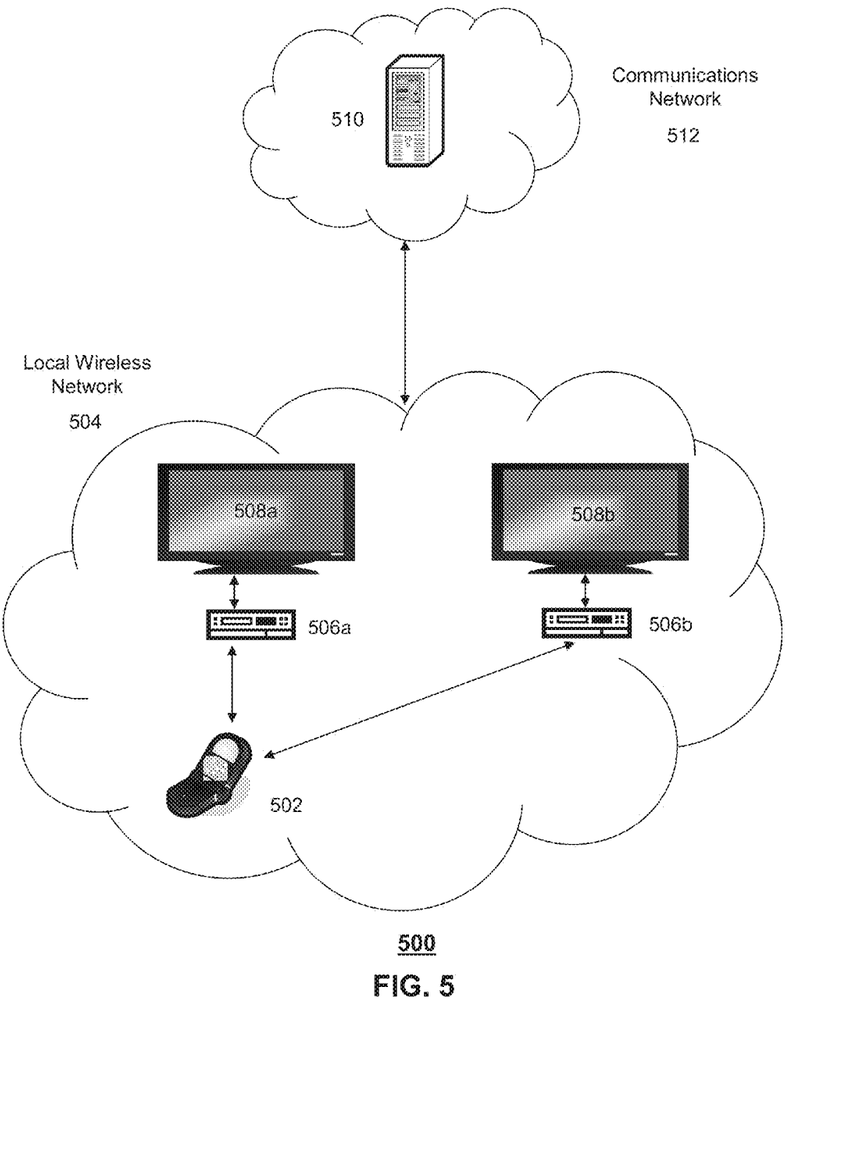
FIG. 5 depicts an illustrative embodiment of a system for detecting a media device, which can operate in portions of the communications systems of FIGS. 1-2.

FIG. 5 depicts an illustrative embodiment of a system 500 for detecting a media device, the system operable in portions of the communication systems of FIGS. 1-2. The system 500 can include a mobile device 502, which can be configured to detect a network, such as wireless network 504. The network can be any kind of network and is not limited to being a wireless network. The mobile device 502 can correlate to mobile device 135 and can include, but is not limited to including, a cellular phone, personal digital assistant, laptop computer, personal computer, smart phone (such as an iPhone™), or other similar device. Additionally, the system 500 can include one or more media processors 506a-b. The media processors 506a-b can be STBs or other similar devices capable of receiving, transmitting, and/or displaying media content. The media content that the media processors 506a-b can handle include video, still image, audio, text, and data content. Notably, the mobile device 502 can be operably coupled to the media processors 506a-b.

System 500 can also include one or more display devices 508a-b, which can be monitors, televisions, or other similar devices capable of outputting media content. The display devices 508a-b can be operably coupled to the media processors 506a-b. Furthermore, the system 500 can include a server 510, which can be configured to operate in a communications network 512. The server 510 can deliver media content to the media processors 506a-b and can performing other processing functions. The devices in the system 500 can also be configured to operate in or communicatively link to an iTV network, such as communications network 512. The iTV network can include IPTV, interactive cable television, and interactive satellite television.

Operatively, the mobile device 502 can detect that a user is at home by detecting the wireless network 504. Upon detecting the network 504, the mobile device 502 can transmit a request for an audio command to the server 510, which can transmit the audio command to at least one of the media processors 506a-b. The media processors 506a-b can each emit a unique audio signal, such as through a speaker, upon receiving the audio command from the server 510. The mobile device 502 can detect each audio signal by utilizing a built-in microphone or other audio detection device. The mobile device 502 and/or the server 510 can determine the identity of the media processors 506a-b by associating each media processor 506a-b with the unique audio signal it emitted. Notably, the mobile device 510 can be configured to store the identity and/or the unique audio signal of each media processor 506a-b. Once the identities have been determined, the mobile device 502 can issue commands to the media processors 50a-b.

The mobile device 502 can also be configured to detect and record an audio sample associated with a media program outputted by the media processors 506a-b. Once detected and recorded, the mobile device 502 can transmit the audio sample to the server 510, which can be configured to match the audio sample to a channel on one of the media processors 506a-b so as to identify which media processor 506a-b outputted the audio. The server 510 can transmit the identity of the media processor 506a or 506b to the mobile device 502.

The mobile device 502 can store the identity and can issue commands to each media processor 506a-b for which it has stored an identity for.

Figure 6:
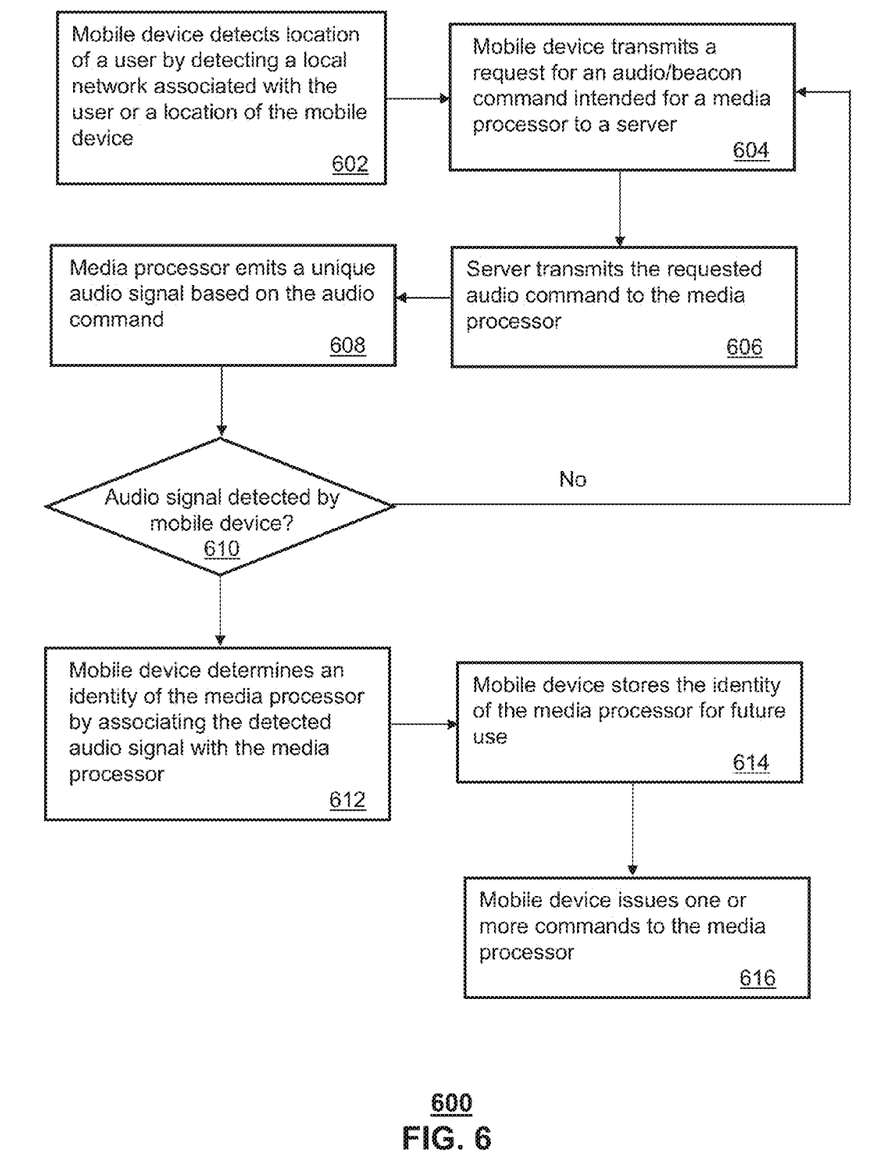
FIG. 6 depicts an illustrative embodiment of a method for detecting a media device operating in portions of the communications systems of FIGS. 1-2 and 5.

FIG. 6 depicts an illustrative method 600 for detecting a media device that operates in portions of the communication system of FIGS. 1-2 and FIG. 5. Method 600 can begin with step 602 in which a mobile device, such as mobile device 502, can detect a wireless network 504 or other network associated with a user. The mobile device 502 can detect the wireless network 504 or other network based on one or more of a service set identifier (SSID), a media access control (MAC) address, and a basic service set identifier (BSSID) associated with the local wireless network 504. Additionally, the mobile device 502 can detect the location of the mobile device 502 by using location services such as GPS, cell-tower triangulation, and other location services. Notably, the detections described above can be performed so that the mobile device 502 can determine that the user is at home or at another location where the user can receive and experience media content. At step 604, the mobile device 502 can transmit a request for an audio/beacon command to the server 510 or other similar device. The audio/beacon command can be intended for one or more media processors, such as media processors 506a-b. Notably, the media processors can be in the vicinity of the mobile device 502.

Upon receiving the request, the server 510 can transmit the audio/beacon command to the one or more media processors at step 606. At step 608, the audio/beacon command can cause the a media processor to emit a unique audio signal/sound, which can be specific and distinguishable from audio signals emitted from other media processors. For example, an audio command issued to media processor 506a can cause media processor 506a to emit two beeps. On the other hand, an audio command issued to media processor 506b can cause the media processor 506b to a chiming sound. Once the media processor emits the sound, the mobile device 502 can be configured to detect the emitted audio signal at step 610. If the mobile device 502 is unable to detect the audio signal, the mobile device 502 can repeat step 604 and request the server 510 to issue an audio command to the media processor so that the media processor can emit the audio signal again. Instead of repeating step 604, the mobile device 502 can also request the media processor to repeat the audio signal.

If the mobile device 502 detects the audio signal, the mobile device can determine the identity of the media processor by associating the audio signal with the media processor at step 612. Using the above example, the media processor 506a can be identified by the two beeps and the media processor 506b can be identified by the chiming sound. At step 614, the mobile device 502 can be configured to store the identity of the media processor in the mobile device 502's memory so that it can remember the identity of the media processor in the future for current or future use. Of course, the mobile device 502 can be configured to store the identities of multiple media processors. In an embodiment, the identity of the media processor can be transmitted by the server 510 to the mobile device 502.

Once the mobile device 502 ascertains the identity of the media processor, the mobile device 502 can begin issuing commands to the media processor at step 616. The commands can include a command to change a channel, a command to receive information for a media program, a command to change the volume, and/or any other command to control the media processor. For example, the mobile device 502 can issue a command to media processor 506a to receive information about a currently playing program. Such information can include a summary of the plot of a movie, the cast in the movie, the running time of the movie, and/or any other relevant information. In another example, the mobile device 502 can include a software program which features a media program/interactive TV guide. An illustration of this would be an interactive application installed on an iPhone™. When using the application, a user of the mobile device 502 can select a channel in the guide, which can cause the media processor to change it's current channel to the selected channel or perform a variety of other actions.

Figure 7:
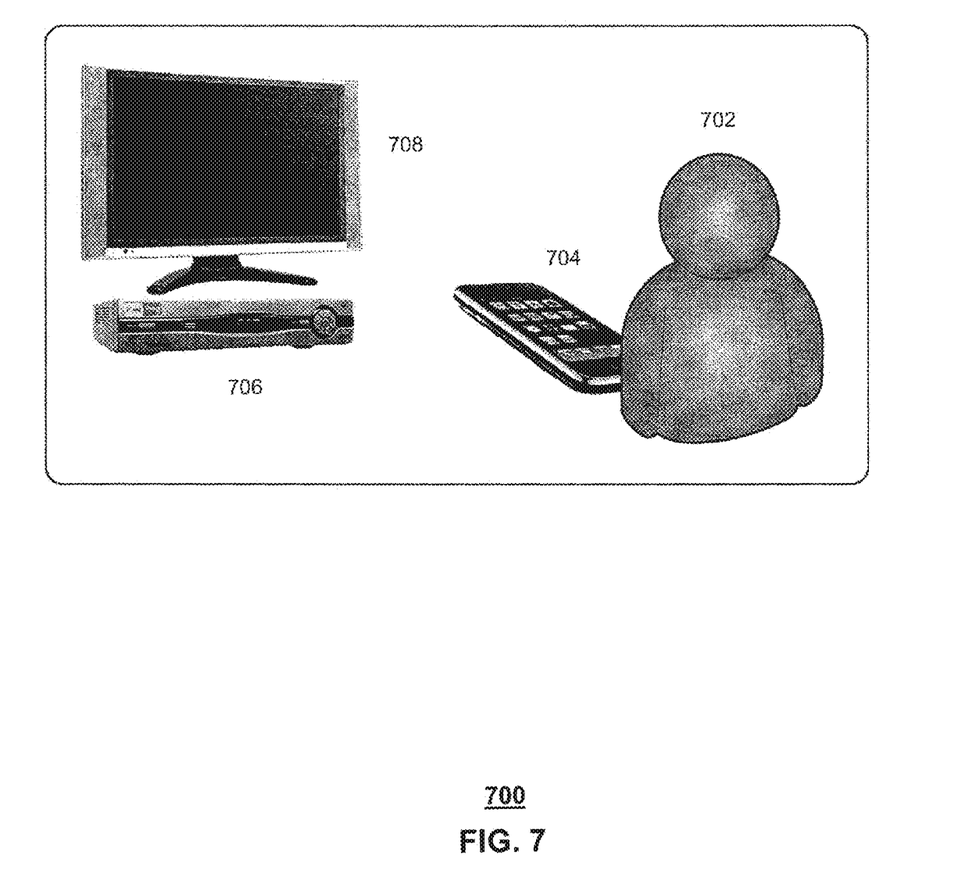
FIG. 7 depicts a scenario featuring a user utilizing a mobile device to detect a media device according to the invention.
Figure 8:
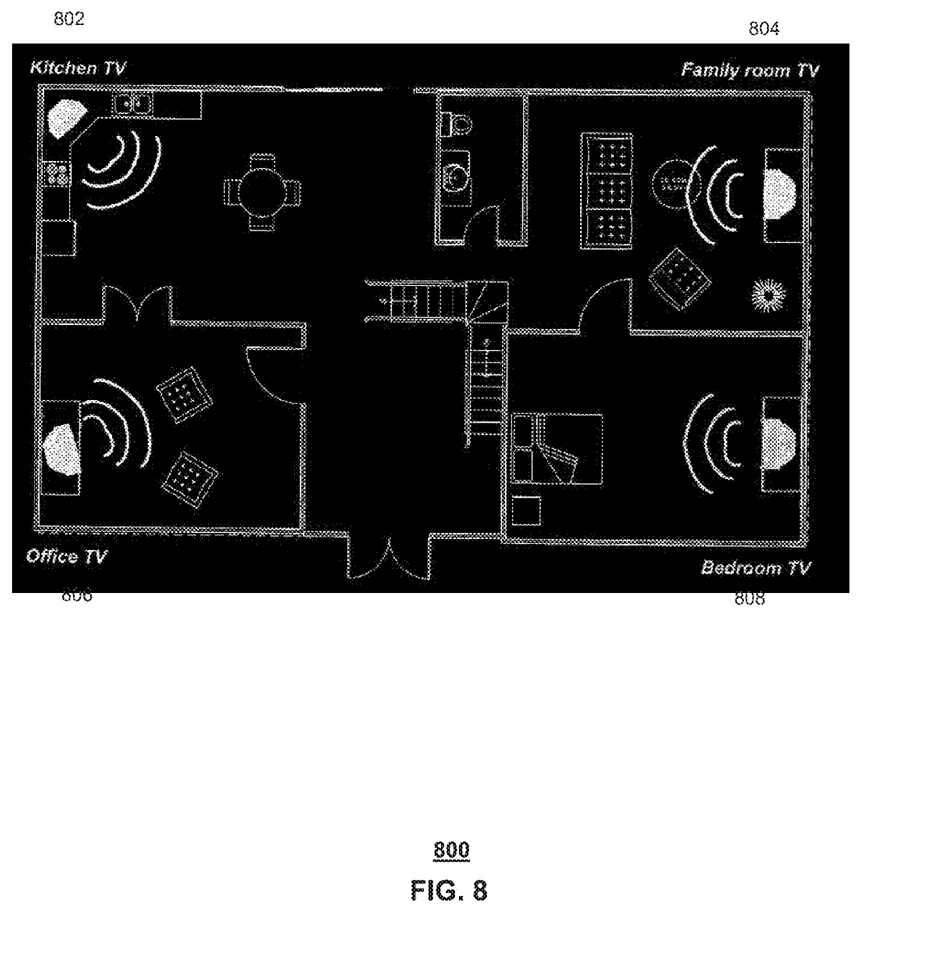
FIG. 8 depicts a scenario involving the detection of multiple media devices in a user's home.

Referring now also to FIG. 7, a scenario where a user is utilizing a mobile device to detect a media processor is illustratively shown. Notably, the user can be utilizing AT&T's U-verse™ in conjunction with a mobile device capable of interacting with the U-verse™, such as an iPhone™. Referring now also to FIG. 8, a scenario is shown which depicts a user home featuring multiple televisions/media processors, such as media processors 802-808, in the user's home. Since users often have multiple televisions in their home, the mobile device 502 can automatically detect which television a user is watching or listening to without requiring input from the user. The mobile device 502 can utilize a built-in microphone to listen for audio signals from the televisions/media processors being watched. As the user walks with his mobile device 502 from one room to the other, the mobile device 502 can be configured to request audio commands from the server 510 and/or issue commands to the appropriate media processor. By knowing the identities of the media processors, the mobile device can prevent the user from issuing commands to the wrong television, such as by requesting the wrong television to change channels.

Figure 9:
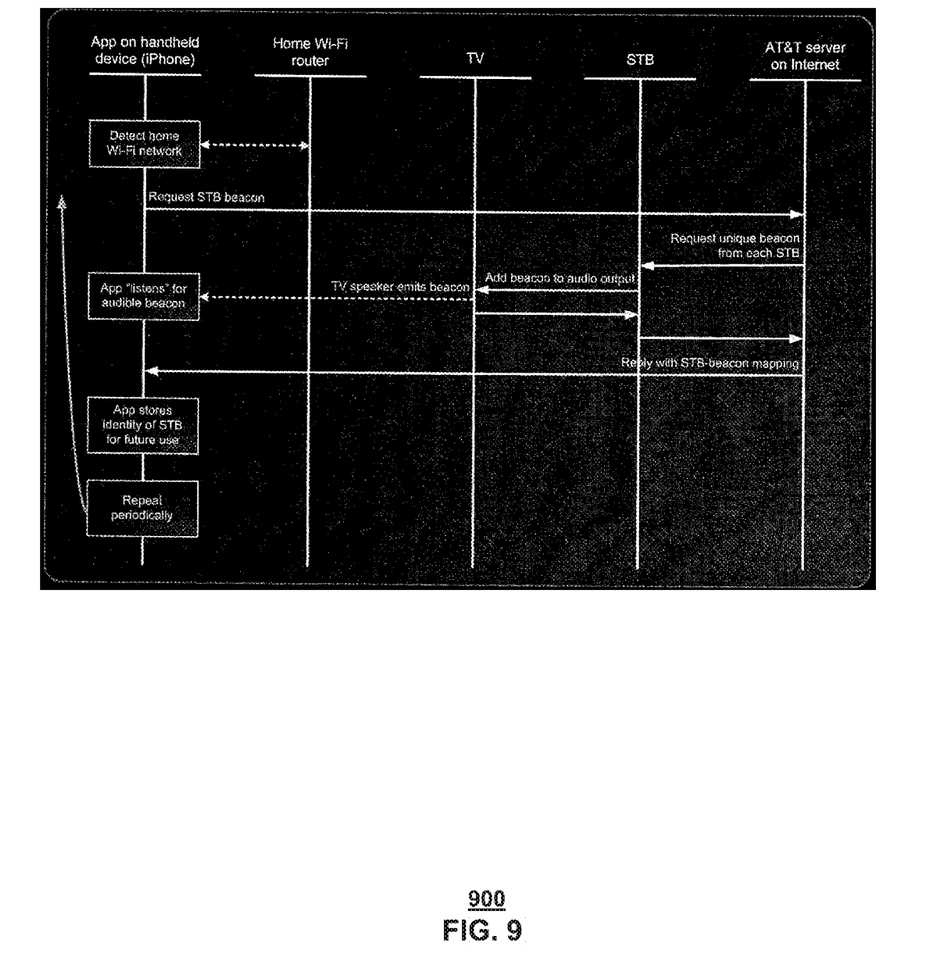
FIG. 9 depicts a flow diagram for detecting media devices by detecting audio emitted from the media devices.

Referring now also to FIG. 9, a flow diagram for detecting media devices by detecting audio emitted from the media devices is illustratively shown. The flow diagram illustrates the basic steps according to a method of the invention. Notably, a software application on the mobile device 502 can detect a wireless network 504 and can then request an audio command from the server 510 on a communications network. The server 510 can transmit an audio command to each media processor to cause the media processor to emit a unique sound. The software application can then "listen" to the audible unique sound and store the association of the sound with the media processor. The server 510 can also transmit a mapping of the media processor with the sound to the application. The mapping can be used to identify the media processor. Once the mobile device 502 determines or receives the identity of the media processor, the mobile device 502 can store the identity. The mobile device 502 can repeat the process periodically for additional media processor or for each time the user's network is detected. Notably, the user does not have to select which media processor they would like to issue commands to, but rather, the mobile device 502 can automatically detect which media processor the user wants to issue commands to based on factors such as the proximity of the television to the mobile device 502 and/or the volume of the programming outputted by the media processor.

Figure 10:
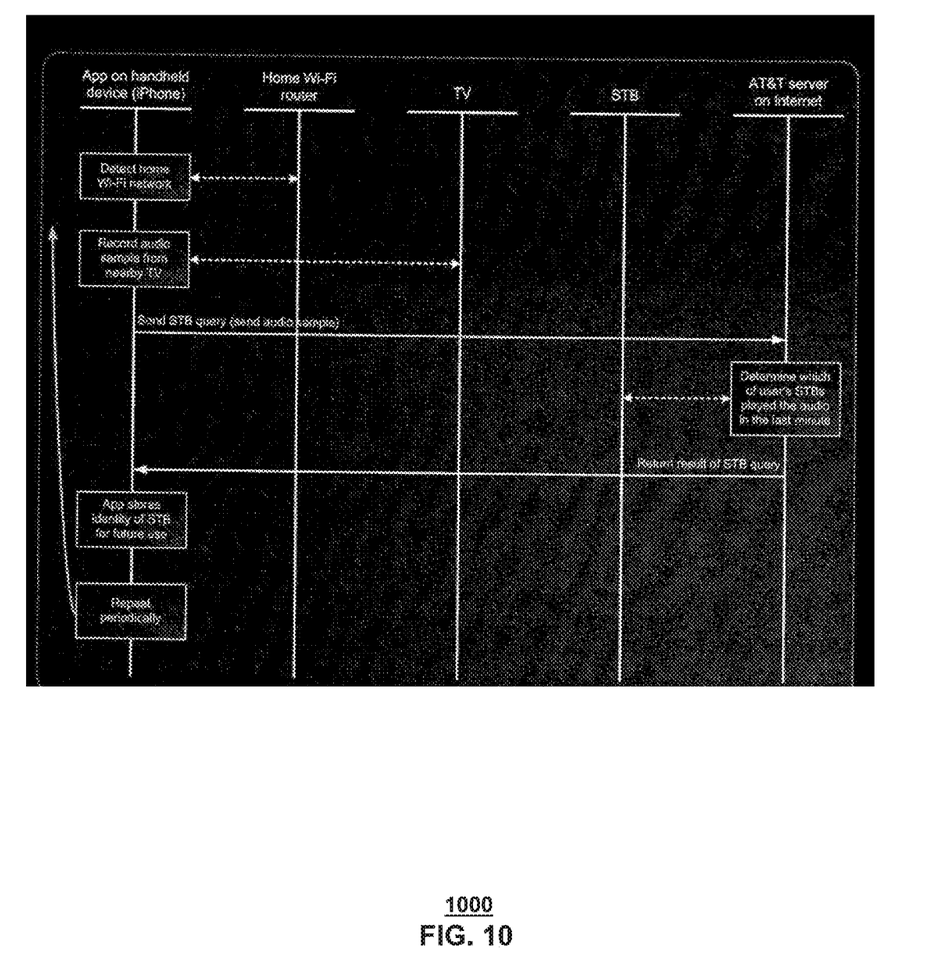
FIG. 10 depicts a flow diagram for detecting media devices through audio sampling.

Upon reviewing the aforementioned embodiments, it would be evident to an artisan with ordinary skill in the art that said embodiments can be modified, reduced, or enhanced without departing from the scope and spirit of the claims described below. For example, another method can include detecting/identifying media processors by detecting audio coming from media programming emitted by the media processors. Referring now also to FIG. 10, a flow diagram illustrating the detection/identification of media processors is shown. In this embodiment, an application on the mobile device 502 can be configured to detect a wireless network or other similar network. Once detected, the mobile device 502 can detect and record and audio sample being emitted from a nearby media processor. After the mobile device 510 has recorded the audio sample, the mobile device 510 can transmit the sample to the server 510.

The server 510 can then determine which channels and media programming are being transmitted to the media processor. Additionally, the server 510 can analyze the audio sample and analyze the prior 60 seconds of the audio of those channels to find a match for the audio sample sent from the application. Of course, the server 510 can analyze any previous amount of audio and the invention is not intended to be limited to the prior 60 seconds of audio to determine the match. When the server 510 determines the match, the server 510 can transmit the identity of the media processor being watched to the mobile device 502. The application can store the identity of the media processor so that it may issue commands to the media processor. The application can also receive information about the media program from the server 510 based on the analysis of the audio sample. Additionally, the application can receive information from the media processor directly. The process can be repeated periodically, such as in the case when the user changes media processors by walking to another room.

In an embodiment, the mobile device 502 can be configured to tag/bookmark a media program or other content that is being outputted by the media processor. By bookmarking the program, the user can follow up with the program at a later time. Since the mobile device 502 is aware of the media processor, the time of day, the bookmark, what programs are shown during the day, this information can be correlated by the mobile device 502 to determine what the user was watching or listening to at the instant they bookmarked the program. Notably, the bookmarks can be stored on the mobile device 502, sent to server 510 or to another server associated with communications network 512, and/or emailed to the user.

Additionally, the bookmarks can be configured to include meta-data about the media program/content that was bookmarked, hyperlinks to access more information about the program, a link to replay all or part of the bookmarked media program, and other similar features. As an example, if a product commercial was bookmarked, the bookmark can contain information about the product/service provided, contact and sales information, and other such information related to the commercial. In an embodiment, an event can be bookmarked and a calendar invitation can be sent.

In another embodiment, content relating to content different from currently playing content can be bookmarked. For example, using the commercial example above, a user can bookmark a commercial for a different program while watching a current program. The bookmark can include a link to record the different program. In an embodiment, if a particular media program is bookmarked, information about the actors, clothing, locations, products, and other such information for a particular scene or scenes can be included in the bookmark. In another embodiment, a screenshot of a scene can be included in the bookmark.

In yet another embodiment, the mobile device 502 can be configured to track what media programs/content the user watches or listens to. By tracking the media programs the user watches or listens to, the mobile device 502 can store a history of the content, provide recommendations for other content that the user would like to experience, and/or allow the user to know the next time the media program will be playing. In one embodiment, the audio signals emitted from the media processors can be inaudible to human or animal ears. In another embodiment, the mobile device 502 and server 510 can be configured to detect and identify media processors by capturing a video sample or other media content sample.

Other suitable modifications can be applied to the present disclosure without departing from the scope of the claims below. Accordingly, the reader is directed to the claims section for a fuller understanding of the breadth and scope of the present disclosure.

Figure 11:
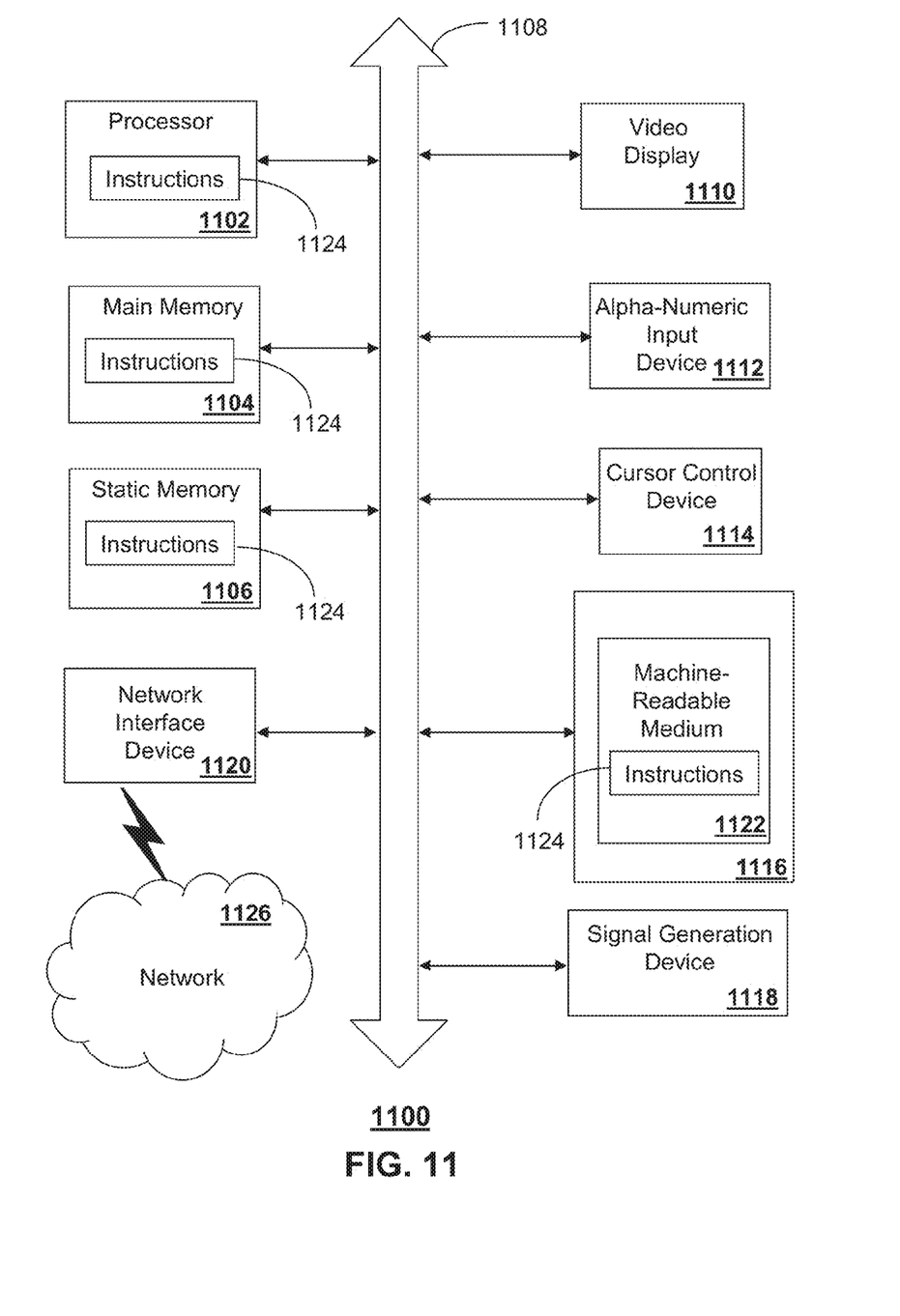
FIG. 11 is a diagrammatic representation of a machine in the form of a computer system within which a set of instructions, when executed, may cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A mobile device, comprising:
   a memory storing computer instructions; and
   a controller coupled to the memory, wherein the controller, responsive to executing the computer instructions, performs operations comprising:
   detecting a location of a user by detecting a network associated with the user or a location of the mobile device, wherein the location of the user includes a media processor;
   transmitting a request for an audio command intended for the media processor to a server on a communications network after detecting the location of the user, wherein the audio command is transmitted by the server to the media processor;
   detecting an audio signal emitted from the media processor, wherein the audio signal is caused by the audio command;
   determining an identity of the media processor by associating the detected audio signal with the media processor; and
   storing the identity of the media processor,
      wherein the media processor, the mobile device, or the server operate in an interactive television network,
      wherein the audio signal is specific to the media processor,
      wherein the audio command and audio signal are separate from media content delivered by the media processor, and
      wherein the media processor for which the request is intended is selected in accordance with proximity of the media processor to the mobile device.

2. The mobile device of claim 1, wherein the operations further comprise detecting the network based on a service set identifier, a media access control address, or a basic service set identifier associated with the network.

3. The mobile device of claim 1, wherein the operations further comprise detecting the location of the mobile device by utilizing a global positioning system and triangulation.

4. The mobile device of claim 1, wherein the interactive television network comprises internet protocol television, interactive cable television, or interactive satellite television.

5. The mobile device of claim 1, wherein the operations further comprise transmitting additional requests for additional audio commands for each media processor of a plurality of other media processors at the location of the server, and wherein the server transmits each audio command to each media processor of the plurality of other media processors.

6. The mobile device of claim 5, wherein each audio command causes a different audio signal to be emitted from each media processor of the plurality of other media processors.

7. The mobile device of claim 6, wherein the operations further comprise detecting the different audio signal from each media processor and determining an identity of each media processor by associating each media processor with the different audio signal emitted from each media processor.

8. The mobile device of claim 1, wherein the operations further comprise issuing a command to the media processor after determining the identity of the media processor.

9. The mobile device of claim 8, wherein the command comprises a command to change a channel, a command to receive information for a media program, or a command to control the media processor.

10. A method, comprising:
  receiving at a media processor an audio command from a server on a communications network, wherein the audio command is requested by a mobile device communicatively linked to the server and wherein the audio command is requested after the mobile device determines that a user of the mobile device is located in a vicinity of the media processor, by detecting a location of the user by detecting a network associated with the user or a location of the mobile device;
  emitting an audio signal after receiving the audio command, wherein the audio signal is detected by the mobile device, and wherein an identity of the media processor is determined by the mobile device based on an association of the audio signal with the media processor; and
  receiving at the media processor a command from the mobile device after the identity of the media processor is determined,
    wherein the media processor, the mobile device, or the server operate in an interactive television network,
    wherein the audio signal is specific to the media processor,
    wherein the audio command and audio signal are separate from media content delivered by the media processor, and
    wherein the media processor for which the request is intended is selected in accordance with proximity of the media processor to the mobile device.

11. The method of claim 10, wherein the audio command is requested by the mobile device after a network associated with a user has been detected by the mobile device.

12. The method of claim 10, wherein the interactive television network comprises an internet protocol television, an interactive cable television, or an interactive satellite television.

13. The method of claim 10, wherein the command comprises a command to change a channel, a command to receive information for a media program, or a command to control the media processor.

14. The method of claim 10, wherein the mobile device is configured to store the identity of the media processor.

15. A non-transitory computer-readable storage medium, comprising computer instructions which, responsive to being executed by a processor, cause the processor to perform operations comprising:
  detecting at a mobile device a location of a user by detecting a network associated with the user and a location of the mobile device, wherein the location of the user includes a media processor;
  transmitting from the mobile device a request for an audio command intended for the media processor to a server on a communications network after detecting the location of the user, wherein the audio command is transmitted by the server to the media processor;
  detecting at the mobile device an audio signal emitted from the media processor, wherein the audio signal is caused by the audio command;
  determining at the mobile device an identity of the media processor by associating the detected audio signal with the media processor; and
  storing at the mobile device the identity of the media processor,
    wherein the media processor, the mobile device, or the server operate in an interactive television network,
    wherein the audio signal is specific to the media processor,
    wherein the audio command and audio signal are separate from media content delivered by the media processor, and
    wherein the media processor for which the request is intended is selected in accordance with proximity of the media processor to the mobile device.

16. The non-transitory computer-readable storage medium of claim 15, wherein the operations further comprise detecting at the mobile device the network based on a service set identifier, a media access control address, or a basic service set identifier associated with the network.

17. The non-transitory computer-readable storage medium of claim 15, wherein the operations further comprise detecting at the mobile device the location of the mobile device by utilizing a global positioning system and triangulation.

18. The non-transitory computer-readable storage medium of claim 15, wherein the interactive television network comprises internet protocol television, interactive cable television, or interactive satellite television.

19. The non-transitory computer-readable storage medium of claim 15, wherein the operations further comprise transmitting from the mobile device additional requests for additional audio commands for each media processor of a plurality of other media processors at the location of the server, and wherein the server transmits each audio command to each media processor of the plurality of other media processors.

20. The non-transitory computer-readable storage medium of claim 19, wherein each audio command causes a different audio signal to be emitted from each media processor of the plurality of other media processors.

* * * * *